United States Patent
Frolik et al.

(10) Patent No.: US 7,149,783 B2
(45) Date of Patent: Dec. 12, 2006

(54) DELIVERY OF SEQUENTIAL INFORMATION

(75) Inventors: William R. Frolik, Albany, OR (US); Kurt J. Hausheer, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 892 days.

(21) Appl. No.: 09/834,764

(22) Filed: Apr. 12, 2001

(65) Prior Publication Data
US 2002/0152257 A1    Oct. 17, 2002

(51) Int. Cl.
*G06F 15/16* (2006.01)

(52) U.S. Cl. ............... 709/207; 709/206; 709/219; 709/226; 709/229; 709/232

(58) Field of Classification Search .......... 709/201, 709/232, 203, 206, 207, 217, 219, 226, 229
See application file for complete search history.

(56) References Cited

U.S. PATENT DOCUMENTS

| | | | | |
|---|---|---|---|---|
| 5,506,902 A * | 4/1996 | Kubota | ............ | 705/51 |
| 5,761,662 A | 6/1998 | Dasan | ............ | 707/10 |
| 5,768,528 A * | 6/1998 | Stumm | ............ | 709/231 |
| 5,819,032 A * | 10/1998 | de Vries et al. | ............ | 709/250 |
| 5,913,032 A * | 6/1999 | Schwartz et al. | ............ | 709/213 |
| 5,974,417 A * | 10/1999 | Bracho et al. | ............ | 707/10 |
| 6,021,443 A * | 2/2000 | Bracho et al. | ............ | 709/241 |
| 6,202,093 B1 * | 3/2001 | Bolam et al. | ............ | 709/225 |
| 6,230,205 B1 * | 5/2001 | Garrity et al. | ............ | 709/231 |
| 6,405,191 B1 * | 6/2002 | Bhatt et al. | ............ | 707/3 |
| 6,484,198 B1 * | 11/2002 | Milovanovic et al. | ............ | 709/218 |
| 6,526,438 B1 * | 2/2003 | Bienvenu et al. | ............ | 709/219 |
| 6,560,645 B1 * | 5/2003 | Igawa et al. | ............ | 709/223 |
| 6,594,682 B1 * | 7/2003 | Peterson et al. | ............ | 709/232 |
| 6,807,568 B1 * | 10/2004 | Tannenbaum | ............ | 709/217 |
| 6,904,449 B1 * | 6/2005 | Quinones | ............ | 709/203 |
| 2002/0152257 A1 * | 10/2002 | Frolik et al. | ............ | 709/201 |

OTHER PUBLICATIONS

Article dated Jul. 3, 2000 from The Industry Standard, p. 112 entitled "To Be Continued: Serials Return" authored by Mark Frauenfelder.

Elaine Matson, "Personal Journal", Online User, Oct./Nov. 1995, (pp. 51-54).

* cited by examiner

Primary Examiner—Bunjob Jaroenchonwanit
Assistant Examiner—Ramsey Refai

(57) ABSTRACT

The publisher of sequential issues of information makes these issues available only in sequence and only in accordance with certain rules such as the sequence can be accessed only for a set number of issues and only in ascending numerical order. A subscriber requests a subscription to the sequential issues. A service provider creates and maintains a unique record of the subscription that contains certain subscriber information. When the subscriber attempts to retrieve an issue, a calculation is made to determine whether the issue requested falls within the rules and time frames established for delivery of the requested issue. Delivery is accomplished for acceptable issue numbers via a network.

48 Claims, 5 Drawing Sheets

DELIVERY OF SEQUENTIAL INFORMATION

TECHNICAL FIELD

The present invention relates generally to electronic publishing. More particularly, the present invention relates to accessing sequentially issued information via an electronic network.

BACKGROUND OF THE INVENTION

The tremendous growth of the number of users accessing the Internet has resulted in an increase in the amount of information published on the World Wide Web. News, weather, and e-commerce, even entire novels are available for downloading over the Internet.

Content prepared for subscription delivery is typically periodical. In other words, the information is delivered only within certain "dated content" constraints. The recipient typically retrieves this content from a fixed Uniform Resource Locator (URL). In order to keep the information current, the publisher has to continually monitor the content during the delivery window. As used herein, the term "publisher" is used to mean the entity that makes content or information generally available to multiple persons, and can include an author of the content.

The timing requirements of this method of electronic publishing put significant demands on the publisher. The publisher must have the content ready before its window of availability. Additionally, the customer is forced to accept delivery of each issue during that window of time. For example, if CNN's Web site runs a series on the space program, each edition of the series must be ready prior to being posted and the customer has a limited time in which to read it before it is replaced with the next in the series.

An additional problem faced by electronic publishers is that many publications are sequential in nature but do not require delivery during a specific time window. For example, multi-step tutorials or the chapters of a novel should be read in a sequential order but don't necessarily require that they be published within any predetermined time.

A problem faced by electronic publishing users is that every person has a different schedule when it comes to reading for pleasure. One reader may enjoy and have the time for reading daily while another reader may only have time to read a novel on a weekly basis. Current publishing and delivery systems cannot accommodate the delivery preferences of both types of readers subscribing to the same content. There is a resulting unforeseen need to provide electronic publishing of content having a sequential nature in a manner that allows a variable schedule delivery satisfactory to the consumer but without violating constraints placed on the sequentiality or timing of the content by the publisher or author for artistic, economic, or other reasons

SUMMARY OF THE INVENTION

The present invention encompasses the delivery of serialized content to a user's content receiving device by obtaining content having a plurality of portions arranged in a predetermined sequential order. A first delivery rule is received for the content and a next portion of the plurality of portions is determined for the user to receive in accordance with the predetermined sequential order. A portion of the plurality of portions of content is delivered to the user's content receiving device in accordance with the first delivery rule and the determined next portion.

DETAILED DESCRIPTION OF THE PREFERRED EMBODIMENT

The present invention enables an electronic publisher to distribute, over the Internet or other networks, content, information or the like having a serial nature (e.g., periodical issues) while accommodating a schedule that is convenient to the consumer. By allowing a consumer to subscribe to a multi-issue publication and set their own schedule for distribution, a service enables the consumer to read the publication at their leisure and allows the electronic publisher to not be required to monitor the content for time sensitive material. Moreover, the publisher often wishes to maintain control over certain parameters of the publication for artistic, economic, timing, and other reasons. The publisher can require that the sequential information (content) be delivered only in ascending sequential order, for example. Or, the sequential information can only be delivered as a portion, a single issue, in the sequence and only be delivered in a particular time frame. For artistic reasons, an author may require that one chapter of a novel must be followed by a period of time during which the next chapter will not be allowed to be delivered. The present invention offers a new physical and temporal dimension to works of authorship while still enabling a consumer to receive the content in portions on a convenient schedule.

Figure 1:
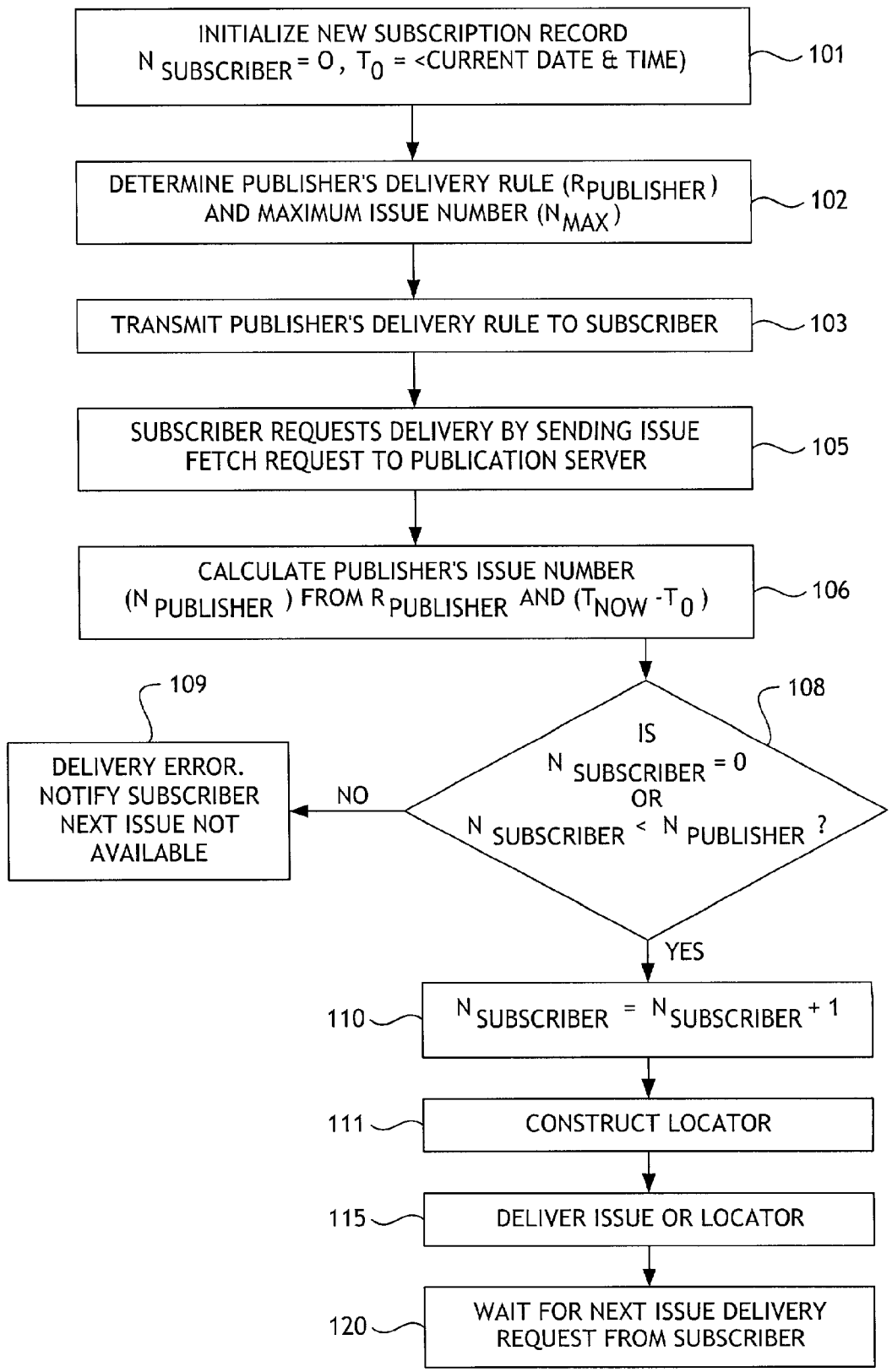
FIG. 1 shows a flowchart of the electronic publication process of the present invention.

The process of a preferred embodiment of the present invention is illustrated in FIG. 1. The process is based on transactions between a consumer (also referred to as the "subscriber" or "user") and a publisher (and the process is known as the "publication server" or "server process"). For each publication to be delivered in the manner contemplated by the present invention, the publication server must be configured with an issue locator mechanism, the maximum issue number, and the publisher's prescribed delivery rule.

A locator mechanism, as used herein, refers to an addressing entity and any associated algorithm that is required to uniquely identify, locate, and access the contents of a particular web page, file document, or other object. A URL is one type of locator in common use. A Uniform Resource Locator (URL) is a text string that conforms to a well-defined standard syntax and embodies a general addressing protocol for web pages, email users, files, and other objects that are accessible via the Internet. Another type of locator is the text string used to fully specify the name and location of a file within a computer's file system.

Actual issue content is ultimately retrieved in accordance with whatever locator mechanism is employed. In a preferred embodiment, the locator mechanism is a base URL, and the specific issues of publication content are obtained at the locations addressed by issue-number variants of the base URL.

A base URL is a template that the server uses to construct the complete locator for all issues of a publication. A locator example might be "http://foo.com/tcq-##-@@.pdf", where the server process is designed to recognize "##" and "@@" as markers. The markers are then replaced with, in one embodiment, a 4-digit issue number and a 6-character "random character key", respectively. The "issue number variant of the base URL" would be the phrase that results from the substitution (e.g., http://foo.com/tcg-0001-B9DXF3.pdf). This locator scheme is discussed in more detail subsequently.

A significant portion of the publisher's delivery rule is a computer-readable description of the publication's delivery time and frequency, as prescribed by the publisher. Examples of delivery rules might be "every other week at noon on Thursday" ("W2 TH 1200"), or "every day at 6 AM" ("D1 0600").

The subscriber first subscribes to an electronic publication service provider (step 101). Of course, the subscriber employs a receiving device or a computing device such as a personal computer, a personal digital assistant, web appliance, or similar apparatus that will receive serialized content from the service provider. The subscriber contacts the publication server of the service provider, requesting a new subscription. A server software process initiates the subscription by creating a new, uniquely identifiable subscription record. The subscription record is created in a location (e.g., a database) that can be freely accessed, queried, and modified by the server, and is initialized with at least two key pieces of subscriber parameter information: The time and date that the subscription was created ($T_0$), and the subscriber's personal current issue number ($N_{subscriber}$) The issue number ($N_{subscriber}$) is initially set to zero to indicate that the subscriber has not yet received the first issue.

The time and date when the subscriber created the subscription, the subscription inception date, ($T_0$) is needed in order for the publication server to calculate, on any given date, the number of the "publisher's current issue" ($N_{publisher}$) within the sequence. This is the highest-numbered issue that, according to the publisher's delivery rule, the subscriber is entitled to receive. The subscriber's personal current issue number ($N_{subscriber}$) is used in the process of the present invention to track where the subscriber is located in the serialized content.

The delivery parameter ($R_{publisher}$) and the maximum issue number ($N_{max}$) for the particular publication are now determined (step 102). The delivery parameter effectively defines the maximum frequency at which sequential issues can be released to the subscriber. A copy of the delivery parameter, which is defined and maintained on the service provider's server, is sent to (step 103) and subsequently used by the subscriber's client software as the subscriber's default delivery rule that specifies when to request the next issue of content. In an alternative embodiment, the subscriber can alter their copy of the delivery rule at any time to fit their own schedule. Each sequential issue is, nevertheless, released to the subscriber, however, only in accordance with the issue release schedule prescribed by the delivery parameter.

On a regular basis, according to the subscriber's schedule, the client software attempts to fetch (step 105) the next issue of content by sending an issue fetch request to the server. The server fields the request and invokes a process that examines certain subscription details (step 106). The subscription details include the delivery parameter, the current date, the inception date, the maximum available issue number, and other portions of the publisher's rule where necessary.

Thus, using the publisher-specified delivery rule, including the delivery parameter, the current date ($T_{now}$), the sign-up date ($T_0$), and the maximum available issue number ($N_{max}$), the process at the server calculates the "publisher's current issue" ($N_{publisher}$). The publisher's current issue is determined by first calculating the number of unique issues that, according to the delivery parameter, would normally be made available between the subscriber's inception date ($T_0$) and the current time and date ($T_{now}$). The calculated value must not exceed the maximum available issue number ($N_{max}$). $N_{publisher}$ thus represents the maximum issue number that the subscriber is entitled to see, i.e., the entitled issue.

Stated another way, the publisher's current issue number is calculated by the function MIN($N_{max}$, NUM_ISSUES ($R_{publisher}$, $T_{now}$, $T_0$)). In this function, the delivery parameter, $R_{publisher}$) the current time, $T_{now}$, and the time of initial subscription, $T_0$, define the function NUM_ISSUES( ). This yields a number of unique issues that the publisher would make available through the service provider during a time interval from $T_0$ to $T_{now}$, and the function MIN( ) returns the lesser of two values.

The server process next compares the publisher's issue number ($N_{publisher}$) with the subscriber's personal current issue number ($N_{subscriber}$) (step 108). If the subscriber's personal issue number is less than the publisher's number, or if the subscriber's personal issue number is equal to zero (step 108), the subscriber's personal issue number is incremented (step 110) by one.

If the subscriber's personal issue number is not less than the publisher's issue number, a delivery error condition is generated (step 109) and sent to the subscriber. The error is an indication that a next issue is not available. The subscriber has attempted to fetch an issue that, according to the publisher's delivery schedule, the subscriber is not yet entitled to receive, or, according to the maximum available issue number, does not exist.

If the subscriber's issue number ($N_{subscriber}$) was successfully incremented, the incremented value is used to construct a locator (e.g., a URL or filename) (step 111) for the corresponding issue of content, and the issue is then delivered to the subscriber (step 115). In the preferred embodiment, the issue locator is transmitted to the subscriber's computer that may then use the locator to retrieve, via a transfer protocol such as "http" or "ftp", the actual issue content for printing, monitor presentation, or storage.

In an alternate embodiment, the server first uses the locator to retrieve the issue contents then sends the actual content to the subscriber for printing, presentation, or storage. The process then waits (step 120) for the next delivery request from the subscriber. This request can be a fetch command, a print on demand command, or a view command.

Figure 2:
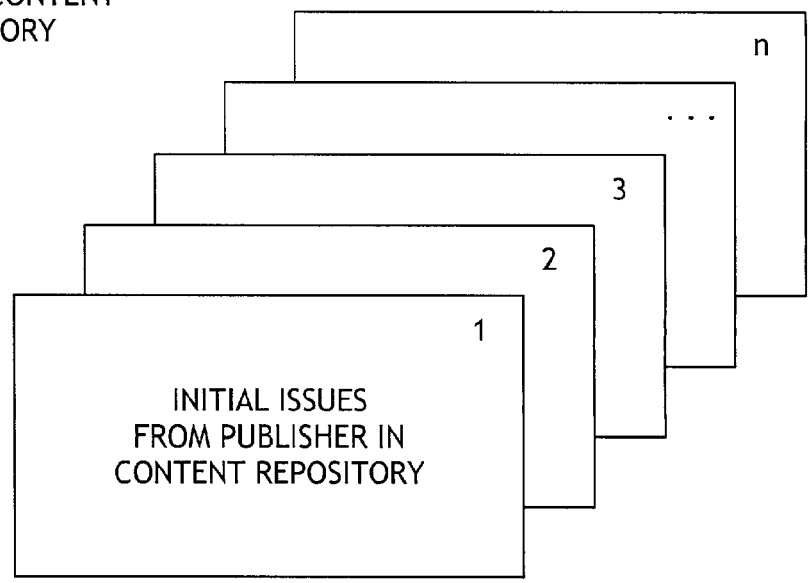
FIG. 2 shows a diagram of the flexibility of the variable schedule publication of the present invention.
Figure 2:
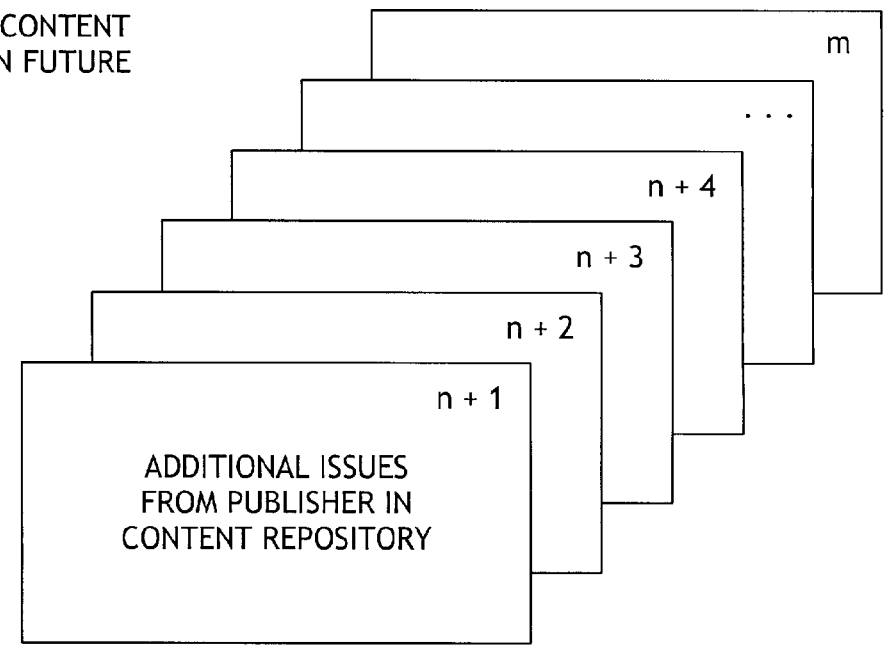

FIG. 2 illustrates an example of a preferred embodiment of the issues or portions of content. Individual portions of the content exist as randomly selectable files in a common repository where each file's name identifies its issue number. The subscriber's client software accesses the content by performing a file transfer protocol (FTP) from a URL that is obtained from the server.

Initially, the publisher may store already completed issues of content (200) at the URL even though the entire sequence is not yet completed. The publisher can then store additional portions of content in the future (210) when it has been completed.

The content may be stored at the same service provider server as the one discussed above or a different server. In an alternate embodiment, the content is spread among multiple servers. The publication server process that fields issue retrieval requests uses an algorithm or mechanism to construct, given a specific issue number, the appropriate locator needed to retrieve the actual issue content.

In a preferred embodiment, the subscriber's personal issue number is used to construct the locator for the issue to be delivered. In an alternate embodiment, the issue number and other constant publication-unique information may be used to generate a seemingly random character key to obfuscate the filename, making it almost impossible for a person who knows the URLs of the already-delivered content to deduce the URLs of upcoming issues and look ahead at yet-undelivered, postponed, and/or unpaid for, content.

One method for creating a suitably obfuscated name is to assemble each issue's filename from (1) an unchanging name portion, concatenated with (2) a fixed number of digits representing the specific issue number. As an example, issues 1 through 3 of "The Chicago Gazette" might be named with a unique signature like "tcg-0001-RYSLIE.pdf", "tcg-00020-C34LLW.pdf", and "tcg-0003-HQ9LL6.pdf".

In this example, the initial label portion ("tcg") uniquely distinguishes files belonging to "The Chicago Gazette" from other unrelated publications that may reside in the same repository. The label and issue number ("tcg-0001"), taken together, uniquely identify the file for a specific issue. This label/number pairing is attractive in that it facilitates generation of a well-organized list of all files in the repository. An alphanumeric sort of the names of everything in the repository will group together in order, by issue number, all of the files belonging to each publication.

A text-scrambling algorithm generates the "random character" portion. Given the label/number information, the algorithm produces a seemingly random sequence of valid filename characters (e.g., "tcg-0001" yields "RYSLIE"). A corresponding decryption algorithm is not needed. The characters serve only to obfuscate the final name and thereby make it improbable for anyone who does not know the scrambling algorithm to determine the complete filename for a specific issue.

The final portion of the name (".pdf") is this example is well known in the art as the filename extension that identifies the file type. A ".pdf" file generally embodies a document in Adobe Portable Document Formant.

The above description of the generation of the locator mechanism is only one embodiment. The present invention encompasses other methods for generating a locator mechanism.

If the subscriber has already received the calculated issue, the content is sent only if the subscriber has elected to have content delivered even if it has not changed. If the subscriber elects to not re-receive content that has already been once delivered, this mechanism effectively suspends delivery when all available issues have been delivered.

If the subscriber does not cancel the subscription, the client software continues to regularly check for new content. All that is necessary to resume delivery is for the publisher to put (or the service provider to obtain) new, appropriately named content into the repository on the server and adjust the maximum available issue number.

The publisher-specified schedule determines the maximum rate at which new issues are released to the subscriber. This is analogous to the periodical frequency of issue for a typical dated publication. If the subscriber adjusts the schedule to fetch less frequently than the publisher's default schedule, a new issue will always be available at each fetch. If the user adjusts the schedule to fetch more frequently, some delivery attempts will determine that the content has not yet changed when, at the time of the request, the calculated publisher's current issue number ($N_{publisher}$) does not yet exceed the value of the subscriber's personal current issue number ($N_{subscriber}$). In this case, the issue will not be printed or viewed. In an alternate embodiment, the client may be configured to print or view old content.

If the subscriber turns off his computer and/or client for an extended period of time, no issues are lost since the subscriber's personal current issue number ($N_{subscriber}$) advances only in response to a delivery request and, therefore, remains unchanged during the downtime. The publisher's current issue number ($N_{publisher}$) meanwhile continues to advance, since it is a computed value based on elapsed time. When the client resumes operation, deliveries resume where they left off.

In a preferred embodiment, the client is responsible for storing the subscriber's preferred delivery. In an alternate embodiment, this schedule is stored on the service provider's server and the server is responsible for transmitting the issue to the subscriber's client software.

If the subscriber's personal, or last delivered, issue number ever lags the publisher's issue number, such as when the subscriber's client is turned off or the subscriber's delivery schedule is substantially slower than the publisher's schedule, the subscriber's most recently printed issue will be one or more issues behind the publisher's current issue. In this case, the subscriber can catch up by repeatedly requesting issue delivery (e.g., by using a "Print Now" feature of the client software) to quickly fetch the additional sequential issues to which they are entitled, but not go beyond the issue that the service provider's server determines to be the publisher's current installment, i.e., the issue number for entitled issues. Alternatively, the subscriber can request catch-up deliveries of content that run from the last received issue number to the maximum issue number for entitled issues available to the subscriber. The entitled issues, of course, cannot exceed the publisher's maximum issue number and must be compliant with any other portions of the publisher's delivery rule that might, for example, place a limit on the maximum number of issues that can be delivered in a single delivery. Also, the subscriber can request back issues from the service provider. A determination is made that the back issue has an issue number smaller than the subscriber's most recently received, or current, issue and a check is made that this back issue number is less than the maximum issue number for entitled issues and otherwise is compliant with any other portions of the publisher's delivery rule before allowing delivery of the back issue.

Figure 3:
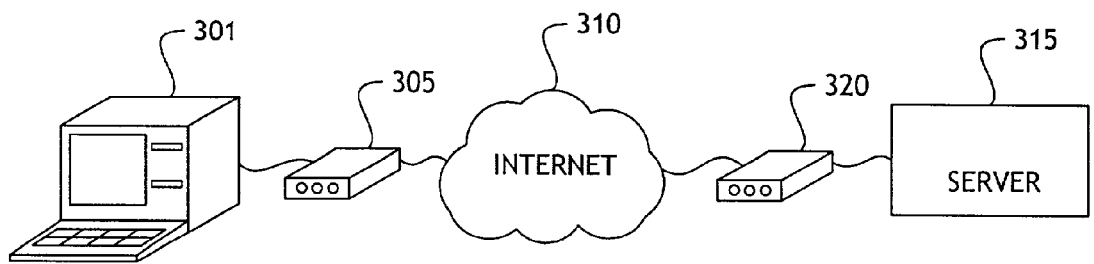
FIG. 3 shows a block diagram of a system using the electronic publication process of the present invention.

FIG. 3 illustrates a preferred embodiment system of the present invention. This system is comprised of a computer device (301) that is coupled to a network interface device (305), such as a modem. The interface (305), which may be either external to or incorporated within the subscriber's computer device (the content receiving device) (301), facilitates transfer of information, both reception and transmission, between the computer device (301) and the Internet (310) via telephone lines, network cable, radio frequency emission, or other medium for which the interface device (305) is designed.

The subscriber's computer device employed in a preferred embodiment of the present invention, is one that comprises a memory, a keyboard, a monitor, a nonvolatile storage device, and a central processor. Such a computer is one that runs operating systems such as WINDOWS and MACINTOSH and is well known in the art.

The service provider's server (315) is also coupled to the Internet through a network interface device (320). This interface device (320) can be either a stand-alone item or be incorporated in the circuitry of the server (315).

In alternate embodiments, the subscriber's computer device (the content receiving device) takes the form of a personal digital assistant such as a PALM device, HANDSPRING VISOR, or APPLE NEWTON. An example of such a personal digital assistant is illustrated in FIG. 4.

Figure 4:
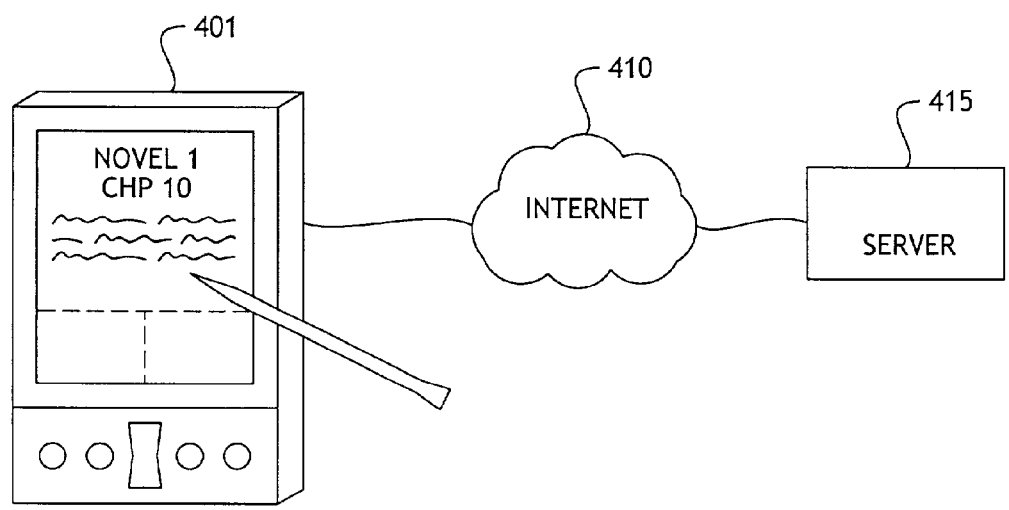
FIG. 4 shows an alternate embodiment of the system in accordance with FIG. 3.

FIG. 4 shows a personal digital assistant (401) coupled to the Internet (410) through either a built-in modem or a stand-alone modem coupled between the personal digital assistant and the telephone lines. The service provider's server (415) is also coupled to the Internet through a built-in or stand-alone network interface device.

In still other alternate embodiments, the subscriber's computer device takes the form of a wireless access protocol enabled wireless telephone or an electronic book that is capable of downloading novels and other information over the Internet. Any computer-based device that can send and receive information for the subscriber over the Internet is encompassed by the present invention.

The content receiving device (computer or personal digital assistant) of the present invention runs the client process of the present invention. In a preferred embodiment, the client process is a software application that is resident in the computer or personal digital assistant. The client process is responsible for providing the handshaking with the service provider's server. The handshaking process includes the subscriber logging in with his or her account information and/or a secret password.

The client process also tracks the downloading over the Internet of the issue content from the service provider's server. Additionally, the client process is responsible for providing the subscriber's subscription identification number to the service provider's server during the handshake process.

The client process provides the user interface for the subscriber to view and print the content that has been downloaded. The user interface includes the controls and drivers required to move about in the content and print the content to a local or network printer.

An alternate embodiment of the client software is a Web browser such as NETSCAPE NAVIGATOR or MICROSOFT INTERNET EXPLORER. The subscriber can type in all of the required information to perform the handshake with the publisher's server to log on. For example, the subscriber can type in his account number, password, and select the document desired.

The subscriber's personal issue number is stored at the service provider's server. The subscriber's unique subscription identification number is stored at the subscriber's computer.

Figure 5:
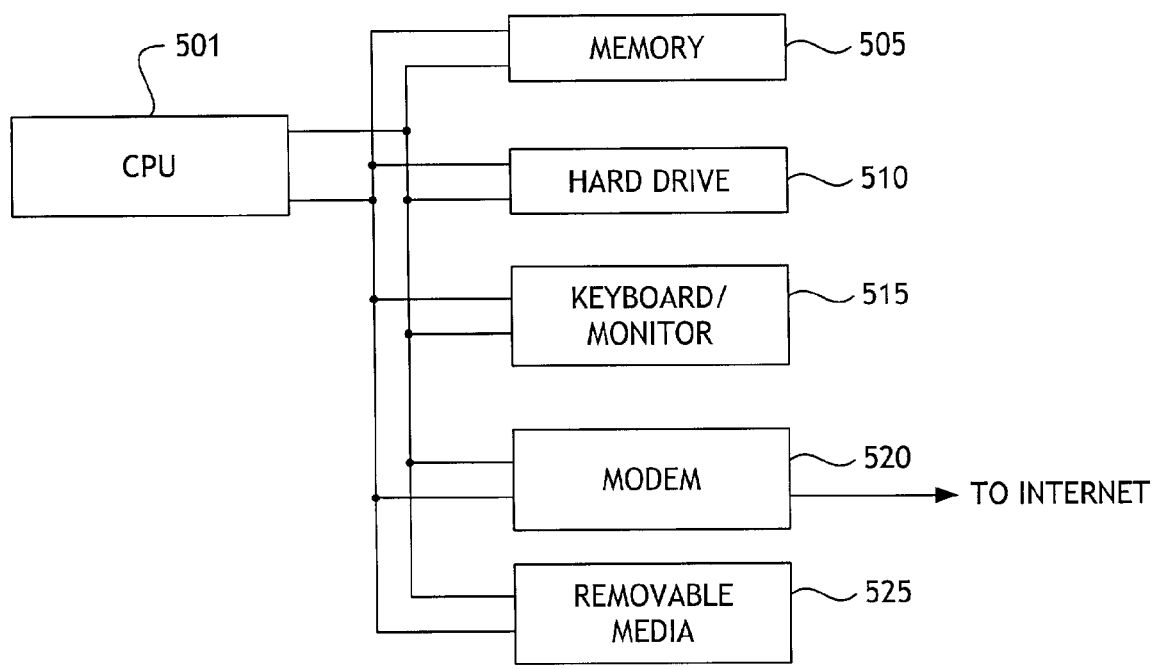
FIG. 5 shows a block diagram of an electronic publisher's server in accordance with the present invention.

FIG. 5 illustrates a block diagram of typical computer network server device used by a service provider. This block diagram may also illustrate a computer device used by the subscriber. However, if a personal digital assistant or electronic book is used in the present invention, the block diagram of the computer device may not have all of the elements illustrated in FIG. 5. Additionally, a computer device does not require the removable media in order for the present invention to operate properly.

The server/computer device is comprised of a central processing unit (CPU) (501) that controls the device. The CPU (501) is coupled to the memory (505) over an address bus, data bus, and control bus. In the preferred embodiment, the memory (505) includes both read only memory (ROM) for storing data permanently and random access memory (RAM) for storing data temporarily.

The device is further comprised of a nonvolatile storage device, such as a hard drive (510), for storing software applications, such as the client process, to be accessed by the CPU (501) and executed in memory (505). A keyboard and monitor (515) are used to enter data and display data, respectively. The modem (520) provides the interface between the computer and the telephone lines. A removable media drive (525), in the preferred embodiment, is a floppy disk drive. Alternate embodiments can have one or more of the following as a removable media drive: CDROM drive, DVD ROM drive, Flash Memory card, Magnetic Tape drive, and ZIP drive.

The delivery process of the present invention may or may not be fee based. If the publisher or service provider does not charge a fee to subscribe to the delivery process, the publisher or service provider may include advertisements along with the current issue downloaded by the subscriber. The advertisement may be geared toward a special event that is to occur on the next scheduled date for delivery. For example, if the subscriber is expected to read the next issue of content around April 15, the advertisement may be directed towards products such as tax software.

Additionally, when the subscriber retrieves the last installment of the sequential issues of content, the publisher may include a "suggested readings" section. This section informs the subscriber of additional products offered by the publisher that may be of interest to the subscriber since they are similar to the just-read issues.

Figure 6:
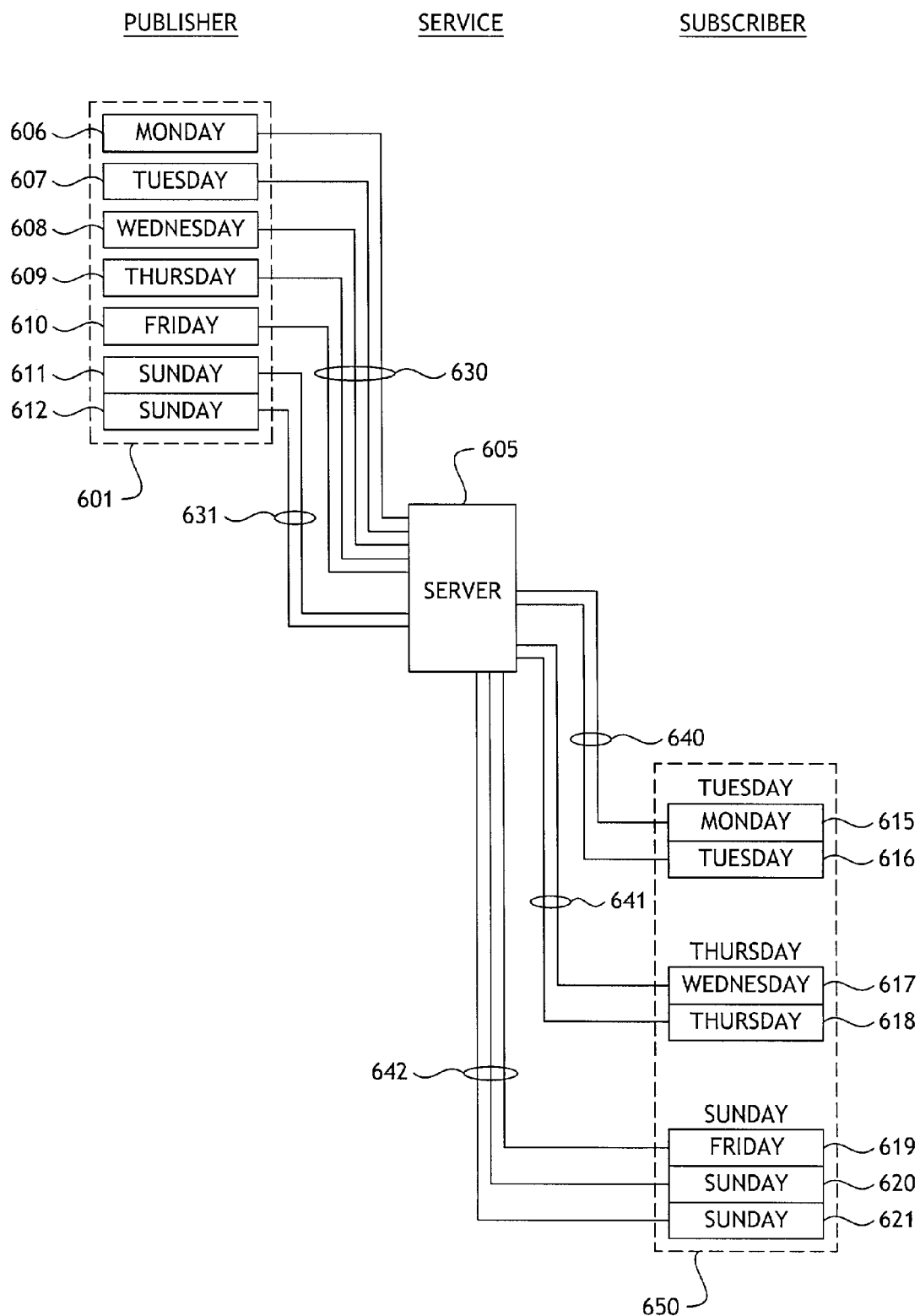
FIG. 6 shows a block diagram of the publisher-service-subscriber system of the present invention.

FIG. 6 illustrates an example of the publisher/server/subscriber system of the present invention. A content repository (601) is designed and located such that the service provider can freely place new issues of information either directly or indirectly, via the publication server (605) or other intermediary system, into the repository (601). The server (605) must be able to construct a suitable locator (e.g., a URL or filename) that the server, subscriber client, browser, or other subscription delivery process can then use to retrieve a specific issue of information from the group of available issues that exist in the repository (601). In the preferred embodiment, the repository (601) exists at the server (605) that is administered by the service provider, which obtains content from a publisher.

In an alternate embodiment, the repository (601) exists in a location maintained by the publisher and made accessible to other processes that include one or more service provider servers or subscriber clients. In another embodiment, the server (605) is also administered by the publisher.

The publisher, in this example, prepares a group of five "weekday" issues of information (630) that is obtained for deposit in the content repository (601) on Sunday in preparation for the upcoming week. The publisher also prepares a group of two "weekend" issues of information (631) that is obtained for deposit in the content repository (601) on Friday in preparation for the upcoming Sunday. Individual issues of information are sequentially and uniquely numbered in order of their intended release. If, in this example, the publisher's initial group of issues is the weekday block (630), the issues for Monday through Friday would be numbered 1 through 5, respectively. The weekend block (631) would then contain issues 6 and 7, both for release on Sunday. Continuing in this manner, a subsequent group of weekday issues for the next week would begin with issue 8.

In an alternate embodiment, there is only one group of multiple issues of information that the publisher transfers into the repository (601) on a regularly scheduled basis. In another embodiment, there are multiple groups of information that the publisher transfers into the repository (601), each group having a unique schedule of deposition that is set by the publisher.

The service provider's server (605) has an appropriate means of determining, for any specified time and date after the creation of a new subscription, the number of the specific issue of information that the subscriber (650) is entitled to receive in accordance with an issue release schedule. In the preferred embodiment, the release schedule is prescribed by the publisher and agreed to by the issue publication service.

In an alternate embodiment, the release schedule is prescribed by the issue publication service and agreed to by the publisher. In this example, the publisher's Delivery Schedule stipulates that one issue shall be released each day on Monday through Friday, there shall be no issue released on Saturday, and there shall be two issues released on Sunday.

Once the server (605) is prepared with the mechanisms for determining the number of the issue that the subscriber is entitled to receive, for determining the locator required in order to retrieve the issue content, and is aware of the maximum issue number for the issued of information located in the repository (601), the server (605) is ready to field requests from subscriber clients to initiate subscriptions and deliver issues. Once the subscriber client (650) is prepared with an issue delivery schedule, it is ready to request delivery of issues of information from the server (605). In a preferred embodiment, the client's issue delivery schedule is the same as the publisher's issue release schedule. In an alternate embodiment, the client's issue delivery schedule is defined by the subscriber.

FIG. 6 illustrates the subscriber (650) retrieving the information in three different groups (640–642) in accordance with a custom issue delivery schedule that has been defined by the subscriber (650). The subscriber (650) is requesting two deliveries on Tuesday (640), two deliveries on Thursday (641), and three deliveries on Sunday (642).

On Sunday, the publisher deposits five issues (606–610) to be released Monday through Friday on a daily basis. The subscriber's two delivery requests on Tuesday (640), therefore, are allowed to retrieve the Monday (615) and Tuesday (616) issues of information. Similarly, the subscriber's two delivery requests on Thursday (641) are allowed to retrieve the Wednesday (617) and Thursday (618) issues of information. On Friday, the publisher deposits the two weekend issues (611–612), both of which are to be released on Sunday. The subscriber's next group of delivery requests occurs on Sunday (642) and is allowed to retrieve the Friday (619) and both Sunday (620–621) issues of information.

The example of FIG. 6 is for illustration purposes only. The present invention is not limited to the groupings and scheduling illustrated in this figure.

In summary, the present invention provides a publisher with the ability to publish material once without the need to periodically update or monitor it. Users can subscribe to a service provider's offering of the content, paying for the subscription, for many years after publication. The delivery of all issues is guaranteed since each subscription, regardless of when the subscription is initiated, begins with a specific first issue, and is delivered according to sequential issue numbers rather than relying on the customer to fetch the content on a specific date. Batches of publications such as crossword puzzles and quotes of the day can be deposited in a single location and, by using the issue number and publication-specific constants to generate and embed a seemingly random key into the URL, it is nearly impossible for one to deduce, through examination of previously exposed URLs, the URL for an upcoming issue and look ahead to see future content.

Benefits for the subscriber include the flexible downloading of the issues of content. The present invention allows one subscriber to read a novel over a six week period while another subscriber can take six months to finish it. Additionally, the subscriber's subscriptions do not stack up if they are not downloaded right away. They can be suspended and resumed at any time. Moreover, the publisher can maintain a supervision over the sequence and timing of delivery long after the initial offering of the content.

What is claimed is:

1. A method for delivering sequentialized content to a user's content receiving device, comprising the steps of:

obtaining content having a plurality of portions arranged in a predetermined sequential order;

accepting a first delivery rule from the user for said content, wherein the user creates and controls a custom issue delivery schedule, wherein the custom issue delivery schedule is required to comply with publisher defined physical and temporal dimensions of the content to maintain control over certain artistic parameters of the content;

determining a next portion of said plurality of portions for the user to receive in accordance with said predetermined sequential order;

creating an obfuscated filename for said next portion of said plurality of portions to prevent the user from deducing a filename of upcoming undelivered portions of said plurality of portions of the content by using a random character key in said obfuscated filename, said random character key is generated using a text-scrambling algorithm by using a label and issue number representing said next portion of said plurality of portions and other constant publication-unique information; and delivering said next portion of said plurality of portions of said content to the user's content receiving device in accordance with said first delivery rule and said determined next portion.

2. A method in accordance with the method of claim 1 wherein said step of accepting said first delivery rule further comprises the step of accepting said first delivery rule from a provider of said content.

3. A method in accordance with the method of claim 1 further comprising the step of receiving a request for content delivery from the user's receiving device.

4. A method in accordance with the method of claim 1 wherein said step of determining a next portion further comprises the step of recalling an indication of which portion of said plurality of portions was last delivered to the user's content receiving device.

5. A method in accordance with the method of claim 1 wherein said step of determining a next portion further comprises the step of determining a user's service sign-up date.

6. A method for receiving, by a user's content receiving device, sequentialized content having portions arranged in predetermined sequential order, comprising the steps of:

receiving a first delivery rule from the user, wherein the user creates and controls a custom issue delivery schedule, wherein the delivery schedule is required to comply with publisher defined physical and temporal dimensions of the content to maintain control over certain artistic parameters of the content;

establishing a second delivery rule;

creating an obfuscated filename for a next portion of said sequentialized content to prevent the user from deducing a filename of upcoming undelivered portions of said sequentialized content by using a random character key in said obfuscated filename, said random character key is generated using a text-scrambling algorithm by using a label and issue number representing said next portion of said sequentialized content and other constant publication-unique information; and requesting delivery at a time in accordance with said second delivery rule of a said next portion of the sequentialized content that has been selected in accordance with said first delivery rule and a determination of a last portion of the sequentialized content delivered to the user's content receiving device.

7. A method in accordance with the method of claim 6 further comprising the step of accepting delivery of said next portion.

8. A method in accordance with the method of claim 7 further comprising the step of making said at least a first portion perceptible to a human.

9. A method in accordance with the method of claim 7 wherein said step of accepting delivery further comprises the step of receiving a uniform resource locator for the sequentialized content.

10. A method in accordance with the method of claim 7 further comprising the step of identifying said delivered next portion of the sequentialized content as said last portion.

11. A method in accordance with the method of claim 6 further comprising the step of storing said first delivery rule at the user's content receiving device.

12. A method in accordance with the method of claim 6 further comprising the step of storing said first delivery rule at a remote location.

13. A method for providing sequential issues of information to a subscriber's computing device according to a variable schedule, the method comprising the steps of:

depositing a plurality of sequential issues of information from a publisher in a repository;

establishing a publisher's rule for delivery of said plurality of sequential issues to the subscriber's computing device, wherein the publisher's rule for delivery is based on a user defined and controlled custom issue delivery schedule, wherein the delivery schedule is required to comply with publisher defined physical and temporal dimensions of the information to maintain control over certain artistic parameters of the content;

establishing a schedule at a server in accordance with a subscriber parameter;

creating an obfuscated filename for an issue portion of said plurality of sequential issues to prevent the user from deducing a filename of upcoming undelivered portions of said plurality of sequential issues by using a random character key in said obfuscated filename, said random character key is generated using a text-scrambling algorithm by using a label and issue number representing said next portion of said sequential issues and other constant publication-unique information; and making said sequential issues of information available to the subscriber's computing device according to said publisher's rule and said schedule at said server.

14. The method of claim 13 further comprising grouping sequential issues of information to encompass all of the sequential issues of information currently available from the publisher.

15. A method for providing sequential issues of information to a subscriber's computing device according to a variable schedule, the method comprising the steps of:

storing the sequential issues of information in a repository;

determining a maximum available issue number;

determining a publisher delivery rule, wherein the publishers delivery rule is based on a user defined and controlled custom issue delivery schedule, wherein the delivery schedule is required to comply with publisher defined physical and temporal dimensions of the information to maintain control over certain artistic parameters of the content;

transmitting the publisher delivery rule to the computing device;

determining a publisher's current issue value for the sequential issues of information;

determining a subscriber's current issue value for the sequential issues of information;

creating an obfuscated filename for an issue of the sequential issues of information to prevent the user from deducing a filename of upcoming undelivered issues of the sequential issues of information by using a random character key in said obfuscated filename, said random character key is generated using a text-scrambling algorithm by using a label and issue number representing said issue of the sequential issues of information and other constant publication-unique information; and when the subscriber's current issue value is equal to zero or the subscriber's current issue value is less than the publisher's current issue value, making said issue of the sequential issues of information available to the computing device in response to the subscriber's current issue value.

16. The method of claim 15 further comprising the step of determining an inception date that indicates a date the subscriber subscribed to the sequential issues of information.

17. The method of claim 16 wherein the step of determining a publisher's current issue value comprises using the publisher delivery rule, the current date, the inception date, and the maximum available issue to determine the publisher's current issue value.

18. The method of claim 17 wherein the step of determining a publisher's current issue value further comprises the step of determining the lesser of two values according to the function: $MIN(N_{max}, NUM\_ISSUES(R_{publisher}, T_{now}, T_0))$, where the publisher's delivery rule, $R_{publisher}$, the current time, $T_{now}$, and the time of initial subscription, $T_0$, define the function $NUM\_ISSUES()$ that yields a number of unique issues that the publisher would make available during a time interval from $T_0$ to $T_{now}$, and the function $MIN()$ that returns the lesser of two values.

19. The method of claim 15 wherein the step of determining a subscriber's current issue value of the sequential issues of information includes the step of incrementing the subscriber's current issue value when the subscriber's current issue value is less than the publisher's current issue value.

20. The method of claim 15 further comprising the step of transmitting an error message to the subscriber when the subscriber's current issue value is greater than or equal to the publisher's current issue value.

21. The method of claim 15 wherein the step of making available includes the steps of:
generating a file locator using the subscriber's current issue value; and
transmitting the file locator to the subscriber's computing device.

22. The method of claim 21 wherein the step of generating said file locator further comprises the step of generating a Uniform Resource Locator.

23. A method for retrieving sequential issues of information, available from a publisher, by a subscriber on a personal schedule, the method comprising the steps of:
subscribing to the sequential issues of information;
receiving a publisher's delivery rule, wherein the publisher's delivery rule is based on a user defined and controlled custom issue delivery schedule, wherein the delivery schedule is required to comply with publisher defined physical and temporal dimensions of the information to maintain control over certain artistic parameters of the content;
requesting an issue of the sequential issues of information consistent with the publisher's delivery rule and the personal schedule;
creating an obfuscated filename for the issue of the sequential issues of information to prevent the user from deducing a filename of upcoming undelivered issues of the sequential issues of information by using a random character key in said obfuscated filename, said random character key is generated using a text-scrambling algorithm by using a label and issue number representing the issue of the sequential issues of information and other constant publication-unique information; and
receiving the issue of the sequential issues of information in response to the request.

24. The method of claim 23 wherein said step of subscribing further comprises the step of subscribing to a service provider.

25. The method of claim 23 wherein said step of requesting an issue further comprises the steps of:
determining a next issue to be requested in a sequence consistent with said publisher's rule;
determining a delivery date for said next issue according to the personal schedule;
ascertaining that said delivery date is consistent with said publisher's rule; and
requesting delivery of said next issue.

26. The method of claim 23 wherein said step of requesting an issue further comprises the steps of:
determining an issue sequentially earlier than said received issue from the publisher's delivery rule; and
requesting delivery of said sequentially earlier issue.

27. The method of claim 23 wherein the publisher's delivery rule further comprises the step of returning the lesser of two values from the function: $MIN(N_{max}, NUM\_ISSUES(R_{publisher}, T_{now}, T_0))$, where the delivery rule, $R_{publisher}$, the current time, $T_{now}$, and the time of initial subscription $T_0$, define the function NUM_ISSUES( ) that yields a number of unique issues that the publisher makes available during a time interval from $T_0$ to $T_{now}$.

28. A method for providing a service for viewing of sequential issues of information by a subscriber, on a computing device, according to a variable schedule, the method comprising the steps of:
assigning a subscriber issue number to the subscriber;
making available, in a repository, a first group of sequential issues of information;
accessing the repository to obtain at least one sequential issue of the first group of sequential issues of information;
determining a publisher's maximum issue number;
determining a publisher's delivery rule, wherein the publisher's delivery rule is based on a user defined and controlled custom issue delivery schedule, wherein the delivery schedule is required to comply with publisher defined physical and temporal dimensions of the information to maintain control over certain artistic parameters of the content;
determining a maximum issue number for entitled issues available;
transmitting the publisher's delivery rule to the computing device;
receiving a request from the computing device for at the least one sequential issue of the sequential issues of information;
selecting an issue number in response to the received request and consistent with the determined publisher's maximum issue number, the determined publisher's delivery rule, and the determined maximum issue number for entitled issues available;
generating a locator in response to the selected issue number;
creating the locator for the least one sequential issue of the sequential issues of information to prevent the user from deducing a filename of upcoming issues of the sequential issues of information by using a random character key in said obfuscated filename, said random character key is generated using a text-scrambling algorithm by using a label and issue number representing the least one sequential issue of the sequential issues of information and other constant publication-unique information; and
making the selected issue of information available to the computing device in response to the locator.

29. The method of claim 28 wherein said step of selecting an issue number further comprises the steps of:
determining an issue number of the issue last delivered to the computing device;
calculating an issue number next in sequence to said last delivered issue number;
comparing said next in sequence issue number to said determined publisher's maximum issue number;
comparing said next in sequence issue number to said maximum issue number for entitled issues available;
determining compliance of said next in sequence issue number with said determined publisher's delivery rule;
when said next in sequence issue number is less than said determined publisher's maximum issue number and less than said determined issue number for entitled issues available and compliant with said determined publisher's delivery rule, generating said locator for said next in sequence issue number.

30. The method of claim 29 further comprising the step of when said next in sequence issue number is greater than said determined publisher's maximum issue number or greater than said determined issue number for entitled issues available or not compliant with said determined publisher's delivery rule, generating an error message.

31. The method of claim 28 further comprising the steps of:
   determining an issue number of the issue last delivered to the computing device;
   calculating at least one issue number greater than said last delivered issue number and less than said determined maximum issue number for entitled issues available;
   comparing said calculated at least one issue number to said determined publisher's maximum issue number;
   determining compliance of said calculated at least one issue number with said determined publisher's delivery rule; and
   when said calculated at least one issue number is less than said determined publisher's maximum issue number and compliant with said publisher's delivery rule, generating at least one locator.

32. The method of claim 31 further comprising the step of when said calculated at least one issue number is greater than said determined publisher's maximum issue number or not compliant with said publisher's issue rule, generating an error message.

33. The method of claim 28 further comprising the steps of:
   determining an issue number of the issue last delivered to the computing device;
   calculating at least one issue number more than said last delivered issue number;
   comparing said at least one issue number to said maximum issue number for entitled issues available;
      determining compliance of said calculated at least one number with said determined publisher's delivery rule; and
      when said calculated at least one issue number is less than said maximum issue number for entitled issues available and compliant with said determined publisher's delivery rule, generating at least the locator for said calculated at least one issue number.

34. The method of claim 33 further comprising the step of when said calculated at least one issue number is greater than said maximum issue number for entitled issues available or not compliant with said determined publisher's delivery rule, generating an error message.

35. The method of claim 28 wherein the step of generating a locator further comprises the step of generating a Uniform Resource Locator.

36. An apparatus for delivery of sequentialized content to a user's content receiving device, the apparatus comprising:
   means for obtaining content comprising a plurality of portions arranged in a predetermined sequential order;
   means for accepting a first delivery rule for said content, wherein the first delivery rule is based on a user defined and controlled custom issue delivery schedule, wherein the delivery schedule is required to comply with publisher defined physical and temporal dimensions of the content to maintain control over certain artistic parameters of the content;
   means for determining a next portion of said plurality of portions for the user to receive in accordance with said predetermined sequential order;
   means for creating an obfuscated filename for said next portion of said plurality of portions to prevent the user from deducing a filename of upcoming undelivered portions of said plurality of portions of the content by using a random character key in said obfuscated filename, said random character key is generated using a text-scrambling algorithm by using a label and issue number representing said next portion of said plurality of portions and other constant publication-unique information; and
   means for delivering a portion of said plurality of portions of said content to the user's content receiving device in accordance with said first delivery rule and said first delivery rule and said determined next portion.

37. The apparatus of claim 36 wherein the means for accepting said first delivery rule further comprises means for accepting said first delivery rule from a provider of said content.

38. The apparatus of claim 36 further comprising means for receiving a request for content delivery from the user's content receiving device.

39. The apparatus of claim 36 wherein said means for determining a next portion further comprises means for determining a user's service inception date.

40. An apparatus for receiving, by a user's content receiving device, sequentialized content having portions arranged in predetermined sequential order, the apparatus comprising:
   means for receiving a first delivery rule, wherein the first delivery rule is based on a user defined and controlled custom issue delivery schedule;
   means for establishing a second delivery rule, wherein the second delivery rule is required to comply with publisher defined physical and temporal dimensions of the content to maintain control over certain artistic parameters of the content;
   creating an obfuscated filename for a portion of the sequentialized content to prevent the user from deducing a filename of upcoming portions of the sequentialized content by using a random character key in said obfuscated filename, said random character key is generated using a text-scrambling algorithm by using a label and issue number representing said portion of the sequentialized content and other constant publication-unique information; and
   means for requesting delivery at a time in accordance with said second delivery rule of said next portion of the sequentialized content that has been selected in accordance with said first delivery rule and a determination of a last portion of the sequentialized content delivered to the user's content receiving device.

41. The apparatus of claim 40 further comprising means for accepting delivery of said next portion.

42. The apparatus of claim 41 further comprising means for making said at least a first portion perceptible to a human.

43. The apparatus of claim 41 wherein said means for accepting delivery further comprises means for receiving a uniform resource locator for the sequentialized content.

44. The apparatus of claim 41 further comprising means for identifying said delivered next portion of the sequentialized content as said last portion.

45. The apparatus of claim 40 further comprising means for storing said first delivery rule.

46. An apparatus for delivery of sequential issues of information to a subscriber's computing device on a variable schedule, the apparatus comprising:
   a repository that stores the sequential issues of information;
   a processor that identifies:
   a maximum available issue number,
   a publisher delivery rule, wherein the publisher delivery rule is based on a user defined and controlled custom issue delivery schedule, wherein the delivery schedule is required to comply with publisher defined physical and temporal dimensions of the content to maintain control over certain artistic parameters of the content;

a subscription inception date, a publisher's current issue value of the sequential issues of information, a subscriber's current issue value of the sequential issues of information;

an obfuscated filename of a most current issue of the sequential issues of information created to prevent the user from deducing a filename of upcoming undelivered issues a most current issue of the sequential issues of information by using a random character key in said obfuscated filename, said random character key is generated using a text-scrambling algorithm by using a label and issue number representing said most current issue of the sequential issues of information and other constant publication-unique information; and a transmitter that conveys, in response to a delivery request from the subscriber's computing device, said most current issue of the sequential issues of information to the subscriber's computing device consistent with said publisher delivery rule, said publisher's current issue value, a time interval between said subscription inception date and said delivery request, and the subscriber's current issue value.

47. The apparatus of claim 46 wherein said repository further comprises a hard drive resident in a computer network server.

48. The apparatus of claim 46 wherein said transmitter further comprises a network interface device that is coupled to the Internet.

* * * * *

UNITED STATES PATENT AND TRADEMARK OFFICE
CERTIFICATE OF CORRECTION

PATENT NO. : 7,149,783 B2  
APPLICATION NO. : 09/834764  
DATED : December 12, 2006  
INVENTOR(S) : William R. Frolik et al.

It is certified that error appears in the above-identified patent and that said Letters Patent is hereby corrected as shown below:

In column 11, line 18, in Claim 6, after "rule of" delete "a".

In column 12, lines 14-15, in Claim 15, delete "publishers" and insert -- publisher's --, therefor.

In column 14, line 23, in Claim 28, after "for" delete "at".

In column 16, lines 8-9, in Claim 36, after "delivery rule" delete "and said first delivery rule".

Signed and Sealed this

Sixteenth Day of June, 2009

JOHN DOLL
*Acting Director of the United States Patent and Trademark Office*